US009127945B2

(12) United States Patent
Telang et al.

(10) Patent No.: US 9,127,945 B2
(45) Date of Patent: Sep. 8, 2015

(54) SYSTEMS AND METHODS FOR MANAGING A CARGO TRANSACTION

(71) Applicant: Trimble Navigation Limited, Sunnyvale, CA (US)

(72) Inventors: Sanjeev Telang, Pune (IN); Rupendra Kota, Vijayawada (IN); Huzefa Poonawala, Pune (IN); Tushar Joshi, Ratnagiri (IN); Nikita Tahilramani, Ahmednager (IN)

(73) Assignee: Trimble Navigation Limited, Sunnyvale, CA (US)

( * ) Notice: Subject to any disclaimer, the term of this patent is extended or adjusted under 35 U.S.C. 154(b) by 144 days.

(21) Appl. No.: 13/684,042

(22) Filed: Nov. 21, 2012

(65) Prior Publication Data

US 2013/0268191 A1  Oct. 10, 2013

(51) Int. Cl.
*G01C 21/00* (2006.01)
*G08G 1/00* (2006.01)
*G06Q 10/08* (2012.01)

(52) U.S. Cl.
CPC ............... *G01C 21/00* (2013.01); *G06Q 10/08* (2013.01); *G06Q 10/0833* (2013.01); *G08G 1/20* (2013.01)

(58) Field of Classification Search
CPC ... G06Q 10/08; G06Q 10/02; G06Q 10/0631; G06Q 10/083; G06Q 10/087; G06Q 30/06; G06Q 50/30; G08G 1/20; G01S 13/758; G07C 2009/0092; G07C 5/008; G07C 9/00166; G08B 25/08; H04B 1/205; H04L 67/12; H04L 67/125
USPC ........... 701/213; 703/23; 705/1, 28; 717/171; 340/539.13, 539.22, 989
See application file for complete search history.

(56) References Cited

U.S. PATENT DOCUMENTS

| | | | |
|---|---|---|---|
| 7,299,125 B2 | 11/2007 | Marks et al. | |
| 2002/0095308 A1 | 7/2002 | Pragelas et al. | |
| 2002/0138293 A1* | 9/2002 | Kawahara et al. | 705/1 |
| 2003/0101069 A1* | 5/2003 | Sando | 705/1 |
| 2005/0071258 A1* | 3/2005 | Kumakawa | 705/28 |
| 2005/0234699 A1* | 10/2005 | Morrison et al. | 703/23 |
| 2006/0033616 A1* | 2/2006 | Silva et al. | 340/539.22 |
| 2007/0216542 A1* | 9/2007 | Brosius et al. | 340/989 |
| 2008/0129490 A1* | 6/2008 | Linville et al. | 340/539.13 |
| 2009/0189788 A1* | 7/2009 | Faus et al. | 340/989 |
| 2009/0210155 A1* | 8/2009 | Morad et al. | 701/213 |
| 2010/0115505 A1* | 5/2010 | Touati et al. | 717/171 |

* cited by examiner

*Primary Examiner* — James Trammell
*Assistant Examiner* — Sanjeev Malhotra
(74) *Attorney, Agent, or Firm* — Convergence Intellectual Property Law P.C.; Steven Gong

(57) ABSTRACT

Devices, systems, and methods for managing a cargo transaction are disclosed. By transmitting and integrating consignment data and real-time cargo status data including data collected from a GPS-enabled monitoring device to a visual cargo server, a visual cargo data is produced. The visual cargo data is contextualized by integrating with contextual data obtained from one or more contextual servers.

17 Claims, 6 Drawing Sheets

FIG. 3A

SYSTEMS AND METHODS FOR MANAGING A CARGO TRANSACTION

BACKGROUND

The present disclosure relates generally to managing cargo transactions. In particular, the present disclosure relates to network-based systems and methods that allow various parties involved in a cargo shipping transaction to monitor cargo data to enhance real time visibility, transparency, safety, and productivity.

Generally, multiple parties participate in a cargo transaction where a transporter party receives cargo from a consignor and the transporter is tasked to deliver the cargo to a consignee. For example, a consignor of merchandise may wish to have cargo shipped to a receiver or multiple receivers, which in some cases may be the direct consignee. The consignor may also wish to have cargo shipped from one consignor location to a second consignor location. A storage facility such as a warehouse which is not owned by or affiliated with the consignor may store the cargo prior to shipment. The consignor or consignee may hire a transporter such as a trucking company to ship the cargo. The transporter may ship the cargo from a consignor site or a non-supplier warehouse to another consignor site, a consignee (e.g., a receiving party not associated with a consignor), or a warehouse not associated with the supplier or the consignee. A transporter typically owns, operates or is associated with a fleet of vehicles used for shipping, and the size of such a fleet may range from one or a few vehicles to hundreds or thousands. Furthermore, a transporter may be a third party freight forwarder, which does not own or operate its own vehicles, but rather hires other carriers to ship goods on one time or long term basis Currently, cargo transaction data, such as data related to cargo pick up, latest status of the cargo location and delivery confirmation is often dependent on a transporter to inform the consignee and the consignor. Furthermore, the transporter may rely on drivers to update the status of the transaction. Because of the involvement of multiple entities in the transport ecosystem the cargo transaction data may be inaccurate, delayed and/or filtered.

Particularly, a consignor that ships thousands of different cargos from various locations or warehouses to various consignees using multiple transporters typically finds it desirable to easily and accurately monitor the cargo transaction data.

RELATED ART

U.S. Publication No. 20090189788 titled "System and Method for Sensing Cargo Loads and Trailer Movement" by Juan Faus, et al., filed Jan. 29, 2008; U.S. Publication No. 20020095308 titled "System and Method for Facilitating Shipment Transaction Creation and Monitoring" by John Pragelas, et al. filed Nov. 30, 2001; U.S. Publication No. 20080129490 titled "Apparatus and Method for Real Time Validation of Cargo Quality for Logistics Applications" by Jeffery E. Linville, et al., filed Oct. 9, 2007; U.S. Pat. No. 7,299,125, titled "In-transit Package Location Tracking and Reporting" by Laurence V. Marks et al., field Apr. 14, 2004.

SUMMARY

Devices, systems, and methods for managing a cargo transaction are disclosed.

In one aspect, a computer implemented method for managing a cargo transaction comprises the steps of transmitting consignment data to a visual cargo server; tracking cargo status data of a vehicle responsible for delivering the cargo, wherein the at least some of the cargo status data comprises data collected from a GPS-enabled monitoring device; transmitting the cargo status data via a wireless network to the visual cargo server, wherein the visual cargo server integrates the consignment data and the cargo status data to produce virtual cargo data; transmitting contextual data to the visual cargo server; providing a context to the virtual cargo data by integrating the virtual cargo data with the contextual data; and presenting the contextualized visual cargo data to a user.

In another aspect, a computer implemented method of managing a cargo transaction comprising the steps of transmitting consignment data to a visual cargo server; tracking cargo status data of a vehicle responsible for delivering the cargo, wherein the at least some of the cargo status data comprises data collected from a GPS-enabled monitoring device; transmitting the cargo status data via a wireless network to the visual cargo server, wherein the visual cargo server integrates the consignment data and the cargo status data to produce virtual cargo data; transmitting the visual cargo data to a contextual server comprising contextual data, wherein the contextual server is configured to provide a context to the virtual cargo data by integrating the virtual cargo data with the contextual data; and presenting the contextualized visual cargo data to a user.

In yet another aspect, a system for monitoring a cargo transaction comprises a visual cargo server for receiving real time location and cargo status information over a wireless communication network; a monitoring device associated with the cargo, wherein the monitoring device comprises a processor for controlling operation of the device; a GPS circuit for receiving GPS data. The system for monitoring a cargo transaction further comprises a wireless communication modem and antenna in communication with the processor for transmitting GPS location data to the visual cargo server; wherein the visual cargo server is configured to obtain consignment data and integrate said consignment data with the GPS data to produce a visual cargo data and to contextualize said visual cargo data with contextual data.

This, and further aspects of the present embodiments are set forth herein.

BRIEF DESCRIPTION OF THE DRAWINGS

The invention has other advantages and features which will be more readily apparent from the following detailed description of the invention and the appended claims, when taken in conjunction with the accompanying drawings, in which:

FIG. 3A illustrates one embodiment of a user-interface presented the user.

DETAILED DESCRIPTION

Figure 1:
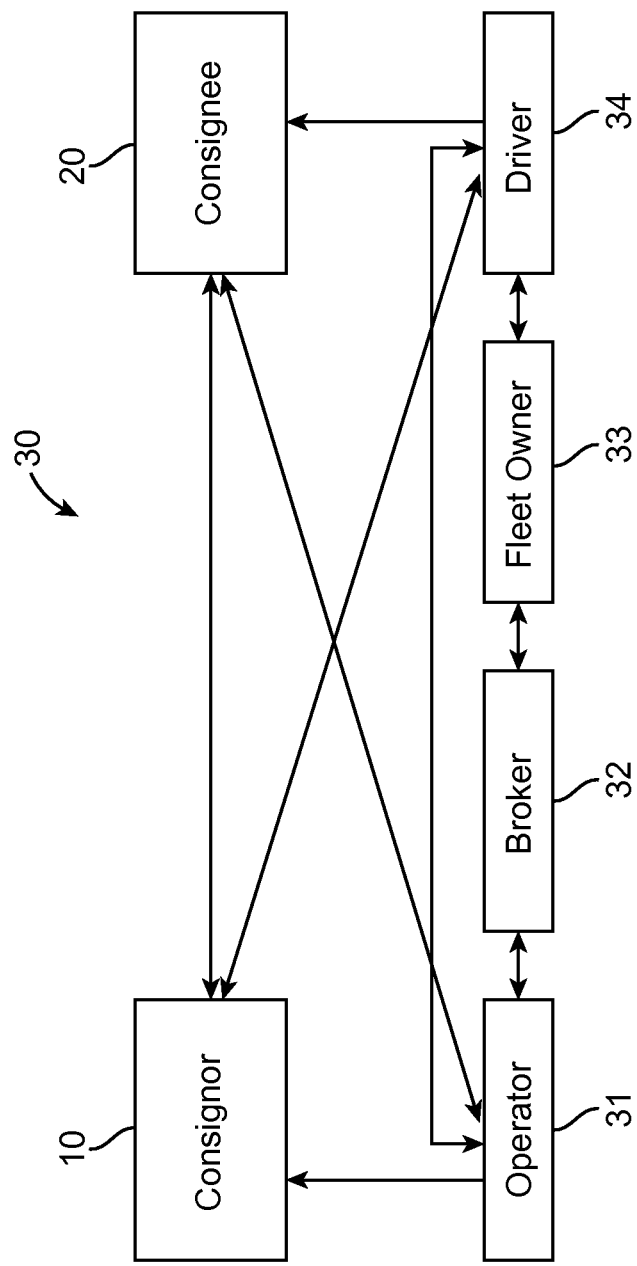
FIG. 1 illustrates a diagram showing one exemplary existing cargo transaction system.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The word "exemplary" is used herein to mean "serving as an example, instance, or illustration." Any implementation described herein as "exemplary" is not necessarily to be construed as advantageous over other implementations.

The present disclosure describes devices, systems, and methods for managing cargo transactions. Specifically, the present disclosure contemplates devices, systems, and methods for contextualized management of a cargo transaction by collecting, integrating, monitoring cargo transaction data and to provide a context to the data based on a user's role.

Referring now to FIG. 1, where an existing cargo transaction system is shown. Cargo transactions as described herein include any transactions in which a source entity sends a cargo to a destination entity. Cargos may be any goods or materials such as produce, mail, packages, cartons, containers, etc. The source entity may be a consignor 10 and the destination entity may be a consignee 20. As used herein, the consignor 10 and consignee 20 may be individuals, companies, business units, facilities, government entities, or other transaction participants. Typically, the consignor 10 sends the cargo to the consignee 20 using one or more transporter 30, where the transporter 30 may be engaged by the consignor 10 or the consignee 20 to pick up, transport, deliver, and/or otherwise facilitate the cargo transaction. For example, the transporter 30 may be charged with delivering the cargo that initially resides at a source location to a destination location wherein the source and/or the destination locations may be a warehouse, storage facility, retail store, residence, and the like. The transporter 30 may be an independent entity such as logistics service provider with no affiliation with the consignor 10 or the consignee 20. Alternatively, the transporter 30 may be affiliated with the consignor 10 and/or the consignee 20. The transporter 30 may be a subsidiary, a unit of, wholly or partly owned or operated by, or a contractor of the consignor 10 and/or the consignee 20.

The transporter 30 may use one or more motorized vehicles to transport the cargo. The term "vehicle" as used in this disclosure includes motorized vehicles including trucks, tractors, trailers, containers, cars, trains, ships, boats, and the like, as well as other assets such as heavy equipment, and similar assets. Additionally or alternatively, the term "vehicle" may include one or more non-motorized vehicles to transport the cargo. Exemplary non-motorized means include bicycles, human carriers, etc.

The transporter 30 may comprise sub-units including operator 31 such as logistic service provider that receives transport requests from and communicates with the consignor and/or the consignee, the operator 31 may operate as a cargo forwarder, wherein the operator 31 does not own or operate its own vehicles, but rather hires a fleet owner 33 which owns and manages the vehicles used to transport the cargo. Optionally, a broker 32 may mediate the communication between the operator 31 and the fleet owner 33. The fleet owner 33 may in turn employ driver 34 who is responsible for operating the vehicle and/or the physical delivery of the cargo.

In the existing cargo transaction system, the consigner 10 and/or the consignee 20 may be dependent on the transporter to inform the status of the cargo. The transporter in turn may be dependent on the one of the sub-units to inform the status of the cargo. For example, transporter 30 may obtain the real-time location of the cargo by inquiring via the sub-units—i.e., the broker 32 inquires the fleet owner 33 who then inquires the driver 34. Alternatively, the transporter 30 may provide the driver information directly to the consignor 10 and/or the consignee 20, and the consignor and the consignee may inquire the driver 34 directly i.e., by calling the driver 34 for the latest status of the cargo. Given the multiple entities involved in the cargo transaction system, it may be difficult for the consignor or the consignee to obtain transparent real-time data on the status of the cargo. Furthermore, the cargo data transmitted to the consignor 10 and/or the consignee 20 lacks contextual data that would render the cargo data within the context of the consignor, consignee, and/or the transporter.

The present disclosure contemplates a novel cargo transaction management device, method, and system that collects and integrates various cargo transaction data including consignment data and real-time cargo status data to produce visual cargo data that is then transmitted to a user, wherein the user may be a consignor, transporter, consignee, or another entity. Specifically, in one embodiment, the visual cargo data is transmitted to a context database whereby the context database selects a context for the visual cargo data; thereafter, the contextualized visual cargo data may be presented to a user.

Figure 2:
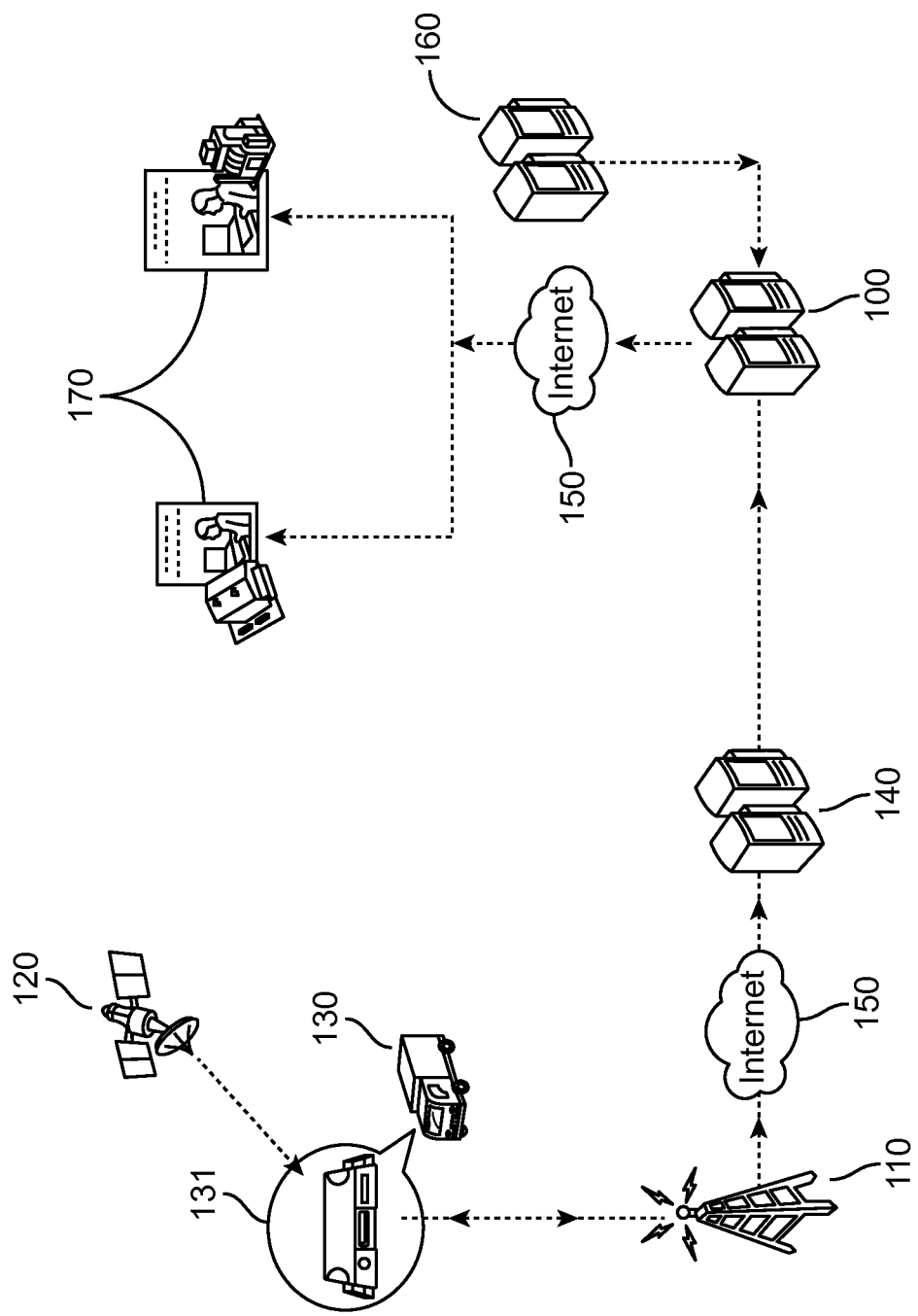
FIG. 2 illustrates one embodiment of the cargo transaction management system

Referring now to FIG. 2, where one embodiment of the cargo transaction management system is shown. As seen in FIG. 2, the cargo transaction system comprises a visual cargo application server 100 that is configured to obtain or receive cargo data from various sources. Although the visual cargo application server 100 is shown exemplarily as one server, it is contemplated that multiple visual cargo application servers 100 may be used. It is further contemplated that the multiple visual cargo application servers 100 may be distributed over multiple locations.

The visual cargo application server 100 may comprise various components including but not limited to a processing unit (CPU), memory unit, video or display interface, network interface, input/output interface and bus that connect the various units and interfaces. The network interface enables the visual cargo application server 100 to connect to the Internet and/or other network.

The memory unit of the visual cargo application server 100 may comprise random access memory (RAM), read only memory (ROM), electronic erasable programmable read-only memory (EEPROM), and basic input/output system (BIOS). The memory unit may further comprise other storage units such as non-volatile storage including magnetic disk drives, flash memory and the like.

The network interface of the visual cargo application server 100 may directly or indirectly communicate with one or more networks such as the exemplary cellular network 110 through a base station, a router, switch, other computing devices, and/or networks. In one embodiment, the network interface may be configured to utilize various communication protocols such as PSTN, GSM, GPRS, EDGE, CDMA, WCDMA, Bluetooth, ZigBee, HSPA, LTE, WiMAX, and the like. The network interface may be further configured to utilize user datagram protocol (UDP), transport control protocol (TCP), Wi-Fi, satellite links and various other communication protocols, technologies, or methods. Furthermore, the network interface may be configured to utilize analog telephone lines (dial-up connection), digital lines (T1, T2, T3, T4 and the like), Digital Subscriber lines (DSL) and the like.

The visual cargo application server 100 further comprises an operating system and other applications such as database programs including a data manager that is configured to store and manage data such as consignment data, real-time data, geographic data, contextual data, etc., hyper text transport protocol (HTTP) programs, user-interface programs, IPSec. programs, VPN programs, account management programs, and web service programs, and the like.

The visual cargo application server 100 is configured to obtain real-time cargo status data while the cargo is in transit in a vehicle 130. As referred to herein, real-time data includes cargo data that are obtained on a real-time, near real-time or periodic basis. In one embodiment, real-time cargo status data may include real-time vehicle data including the location of the cargo, the speed of the cargo, distance of the cargo from the consignor and/or consignee, and the like.

At least some of the real-time cargo status data may be obtained from one or more GPS satellites 120 which communicate with one or more GPS-enabled monitoring device 131 disposed on the vehicle 130 and/or the cargo or otherwise associated with the cargo. In one embodiment, the monitoring device 131 comprises one or more processor for controlling operation of the device and a global positioning system (GPS) circuit for receiving GPS location data. In one embodiment, the monitoring device 131 may be an automotive grade GPS device integrated with the vehicle. In such embodiment, the monitoring device 131 may optionally comprise door sensors configured to detect when a vehicle door or hatch have been opened or closed. Additionally, the monitoring device 131 may comprise vehicle ignition sensors, and any other vehicle mounted sensors. Furthermore, various other sensors such as a RF reader, shock/vibration sensor, a temperature sensor, a radiation sensor, a humidity sensor, a light sensor, a sound sensor, and a gas sensor may be used to collect real-time data related to the vehicle of the vehicle's surrounding. Additionally and optionally, the monitoring device 131 may comprise data storage for recording a plurality of data received from the sensor and the GPS circuit, including a date and time, the cargo location, and the sensed conditions or collected data from sensors.

In another embodiment, the monitoring device 131 may be a personal GPS unit or a device that comprises an embedded GPS circuit, such as a smart phone, PDA, laptop, and the like. In alternative embodiments, other positioning methods can be used in addition or instead of the GPS positioning method, for example, a system comprising ground based beacons may be used.

In one embodiment, the monitoring device 131 comprises a network interface such as wireless communication modem and antenna is configured to communicate with a wireless network 110 wherein the network interface is configured to transmit the real-time vehicle data to the visual cargo application server 100 via the a wireless network 110 using various protocols including GSM, GPRS, EDGE, CDMA, WCDMA, Bluetooth, ZigBee, HSPA, LTE, WiMAX, and the like. Optionally, the wireless network 110 may transmit the real-time vehicle data to the visual cargo application server via another network, such as the Internet 150.

Optionally, in one embodiment, the real-time cargo status data may be transmitted to a fleet management application server 140. The fleet management application server 140 may comprise various components such as CPU, memory, network interface. Furthermore, the fleet management application server 140 may comprise an operating system and other applications such as database programs including a data manager that is configured to store and manage data the GPS generated real-time cargo status data. The fleet management application server 140 may comprise various programs configured to calculate, integrate, manage, present, and transmit the real-time vehicle data. For example, the fleet management application server 140 may comprise hyper text transport protocol (HTTP) programs, user-interface programs, IPSec. programs, VPN programs, account management programs, and web service programs, and the like.

The fleet management application server 140 may communicate with a plurality of vehicles with monitoring devices 131. Additionally or alternatively, the fleet management application server 140 may communicate with one or more additional fleet management application servers which then communicate with one or more vehicles. Furthermore, the fleet management application server 140 may receive additional real-time data such as real-time environmental data. The real-time environmental data includes traffic data along the projected route of the cargo, the current weather condition, man-made and/or natural incident data and the like that could impact the cargo transaction. Additional real-time data may be obtained from one or more databases connected to the fleet management application server 140 via one or more networks, such as the Internet. Additionally or alternatively, real-time environmental data may be obtained from one or more satellites and/or sensors disposed on the vehicle or within the environment. The fleet management application server 140 may then operate upon the real-time environmental data with the real-time vehicle data and perform one or more functions such as calculate, integrate, manage, present, and transmit the real-time environmental data and/or the real-time vehicle data.

Additionally, the fleet management application server 140 may be configured to verify and/or store the real-time data. For example, the fleet management application server 140 may configured to verify whether if the received real-time data is new or current, and updating the recorded real-time data if the data is new or current.

As seen in FIG. 2, the fleet management application server 140 is exemplarily shown as a discrete server; it is further contemplated that the multiple fleet management application servers may be used and the multiple servers may be distributed over multiple locations. It is also noted that some or all of the functions of the fleet management application server 140 may be integrated within the visual cargo application server 100. In such embodiment, the visual cargo application server 100 subsumes some or even all of the functions of the fleet management application server 140 wherein the visual cargo application server 100 communicates with the vehicles to obtain real-time vehicle data and/or additional database to obtain real-time environmental data.

The visual cargo application server 100 is configured to obtain consignment data from one or more consignment databases via one or more networks, such as the Internet. In one embodiment, consignment data includes cargo data such as the type (fragile, perishable, toxic, etc.), weight, dimension, shape, and the like of the cargo. Additionally, consignment data may include cargo identification data such as cargo identification number, Radiofrequency Identification (RFID) data, Barcode data, Quick Response (QR) Code data, High Capacity Color Barcode (HCCB), and the like. Furthermore, consignment data may include originating location codes, originating location geo-codes, destination codes, destination geo-codes, type of the carrier vehicle, vehicle information, driver information, planned route, route code, scheduled pick up time, departure time, scheduled delivery time, estimated delivery time, estimated distance, and the like.

The visual cargo application server 100 is configured to integrate the consignment data and the real-time vehicle data and/or real-time environmental data to compile visual cargo data. The visual cargo data may comprise the expected time of delivery information that is calculated dynamically or adjusted based on the real-time vehicle data (i.e., the vehicle's current position, the current and/or average speed of the vehicle, and the like) and/or the real-time environmental data (i.e., current traffic along the route, road condition, adverse weather, and the like). The expected time of delivery may be updated on a real-time, near real-time or periodic basis. In addition, the visual cargo data may comprise additional information such as vehicle's current or projected position, its position on the scheduled route and route deviation (If any). Various aspects of the visual cargo data may be presented on a geographical map which may include plots of the actual route taken by the vehicle along the planned route on the map.

In one embodiment, the visual cargo data may be associated with a particular cargo. In another embodiment, the visual cargo data may be associated with a particular shipment comprising multiple cargos. In yet another embodiment, the visual cargo data may be associated with a cargo type such as a product type. Visual cargo data may be associated with metadata such as identification number.

In one embodiment, the visual cargo application server 100 is further configured to communicate with one or more contextual servers 160. The contextual servers 160 are configured to access one or more end-user related databases such as one or more enterprise resource planning databases. In one embodiment, the contextual servers 160 is configured to access a consignor database, where in one embodiment the consignor database comprises stock information, billing information, supply information, and the like. In another embodiment, the contextual servers 160 is configured to access a consignee database, where in one embodiment the consignee data comprises stock information, billing information, order information, and the like. In yet another embodiment, the contextual servers 160 is configured to access a transporter database, where in one embodiment, the transport database comprises vehicle information such a vehicle's schedule, location of the next cargo, number of vehicles deployed, vehicle performance information, driver performance information, and the like.

Based on the data provided by the one or more contextual servers 160, the visual cargo data may be contextualized to meet the needs of the end-user. For example, the visual cargo data may be integrated with consignor contextual data such that visual cargo data may be presented in the context of the consignor-centric information, such as how the estimated delivery information found in the visual cargo data will impact the consignor supply or delivery of stock.

The visual cargo application server 100 may transmit the visual cargo data and/or the contextualized visual cargo data to at least one end-use device 170 via one or more networks. In one embodiment, the end-use device 170 may be desktop computers, laptop computers, tablet computers, personal digital assistants (PDA), smart phones, mobile phones, and the like. Generally, the end-use device 170 may comprise a processing unit, memory unit, one or more network interfaces, video interface, audio interface, and one or more input devices such as a keyboard, a keypad, or a touch screen. The input devices may also include auditory input mechanisms such as a microphone, graphical or video input mechanisms, such as a camera and/or a scanner. The end-use device 170 may further comprise a power source that provides power to the end-use device 170 including an AC adapter, rechargeable battery such as Lithium ion battery or non-rechargeable battery.

In another embodiment, the visual cargo application server 100 is configured to transmit the visual cargo data to one or more contextual servers 160. In such embodiment, the contextual servers 160 are configured to contextualize the visual cargo data. Thereafter, the contextualized visual cargo data may be transmitted to the visual cargo server 100 and then transmitted to the end-use device 170. Alternatively, the contextual servers 160 may transmit the contextualized visual cargo data and/or visual cargo data to the end-use device 170.

Figure 3A:
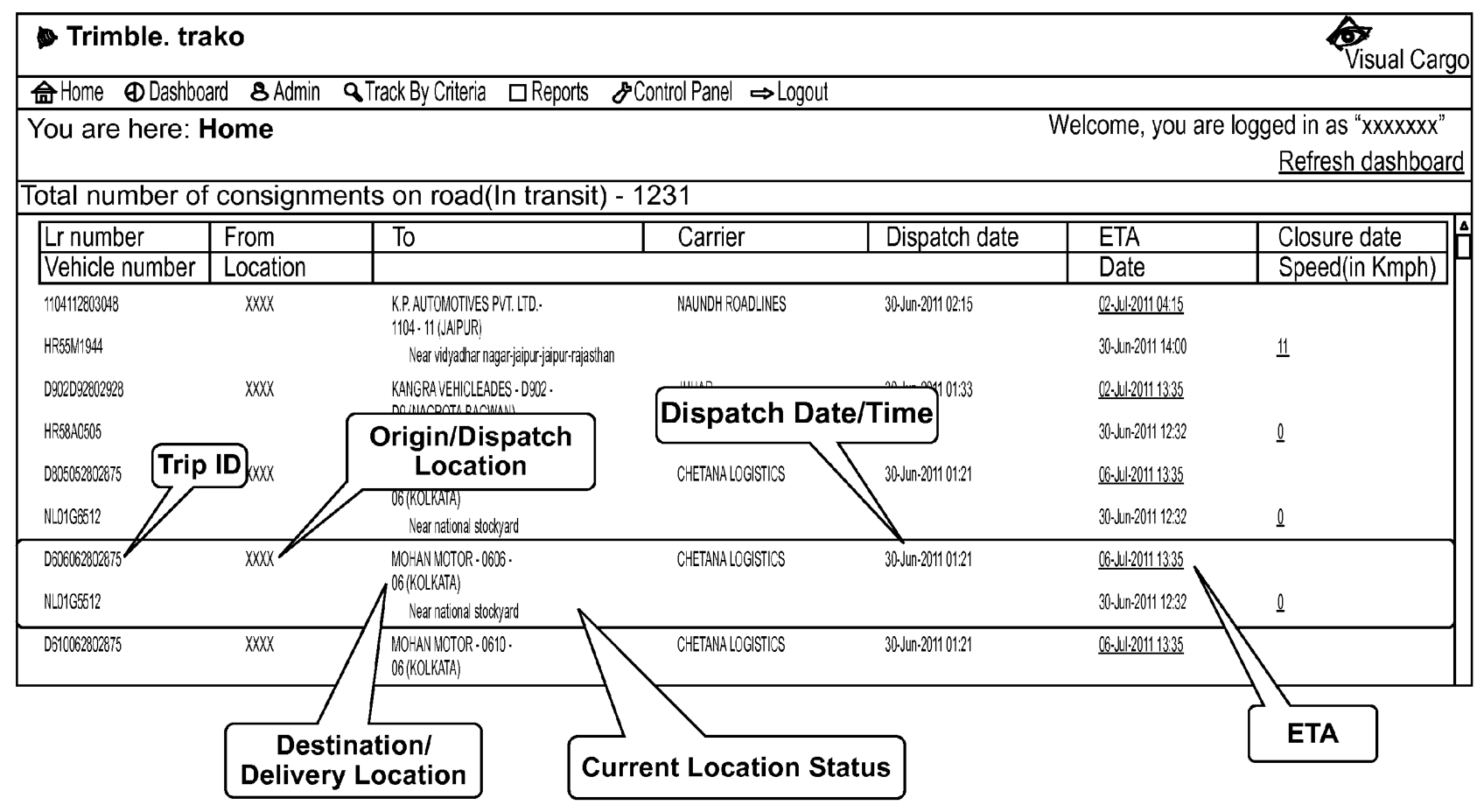
Figure 3B:
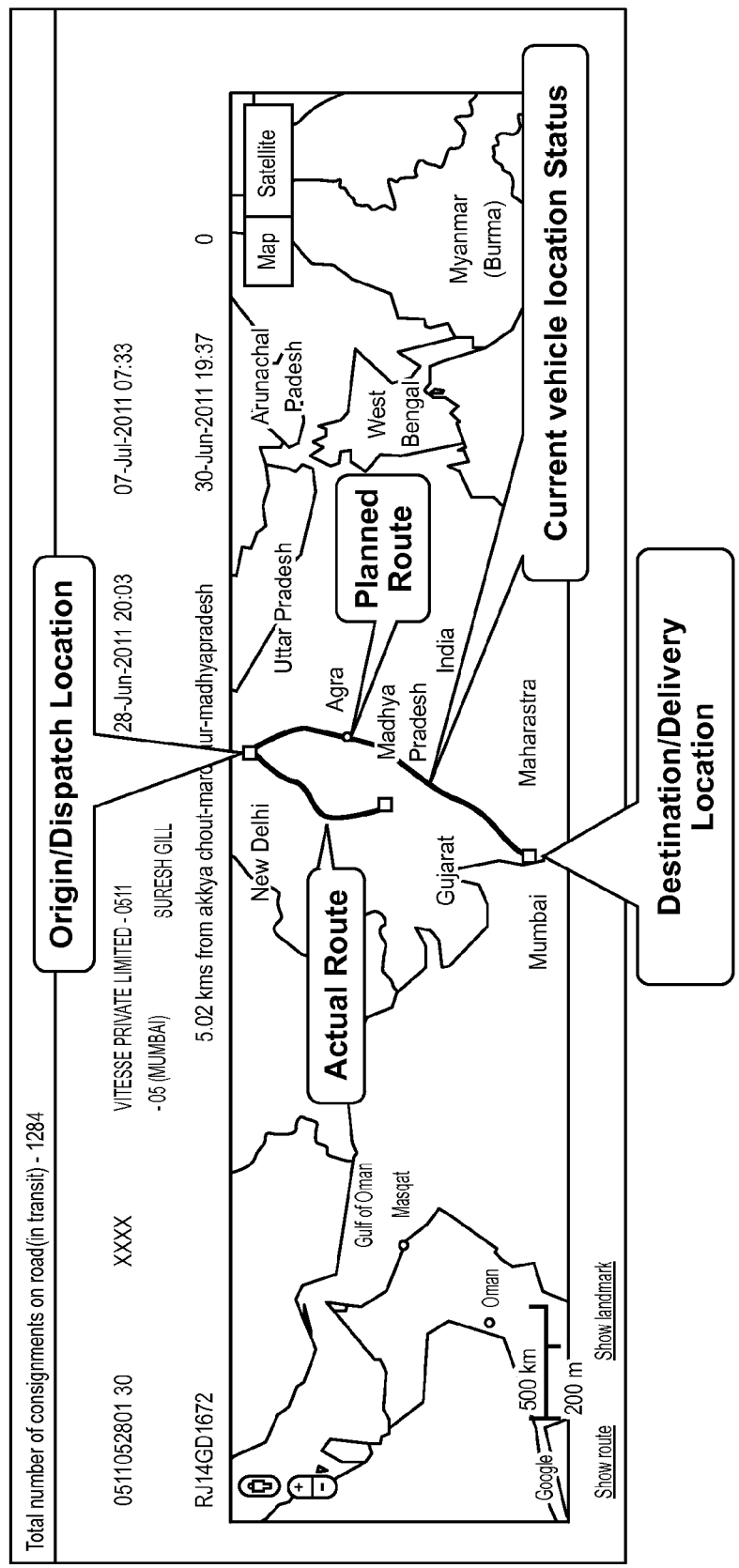
FIG. 3B illustrates one embodiment of a user-interface using a GIS software.

In one embodiment, the visual cargo data and/or the contextualized visual cargo data are transmitted to the end-use device 170 through the Internet. The various data may be presented on a user-interface as exemplarily seen in FIGS. 3A-3B. As seen in FIG. 3A, the user-interface may comprise various data such as trip identification, origin/dispatch location, destination/delivery location, dispatch date/time, current location status, estimated time of arrival, etc. Furthermore, as seen in FIG. 3B, the user-interface may comprise a graphical display of the visual cargo data, such as the planned route of the vehicle, actual route of the vehicle, destination/delivery location, current vehicle location status and the like, which are presented to the user using a Graphical Information System (GIS) mapping software for graphical display of the cargo that is being tracked. The user-interface may be provided by the visual cargo application server 100 as one or more webpage displayed on the end-use device 170. Alternatively, the user-interface may be presented to the end-use device 170 through a dedicated application, a web widget, and the like.

In another embodiment, at least some portion of the visual cargo data and/or the contextualized visual cargo data are transmitted to the end-use device 170 as SMS, email, a post made on micro-blogging website, and the like. For example, the visual cargo server 100 may be configured to send out one or more alerts via as SMS, email, a post made on one or more micro-blogging websites, and the like to the end-use device 170 upon the occurrence of a specific event. For example, if the visual cargo data indicates that the cargo delivery will be delayed by one hour, the consignee may be alerted via a SMS. Furthermore, it is contemplated that the visual cargo server 100 may relay visual cargo data, contextualized visual cargo data, and/or alerts automatically to the end-use device 170, or it can be configured to be interrogated on demand.

Figure 4:
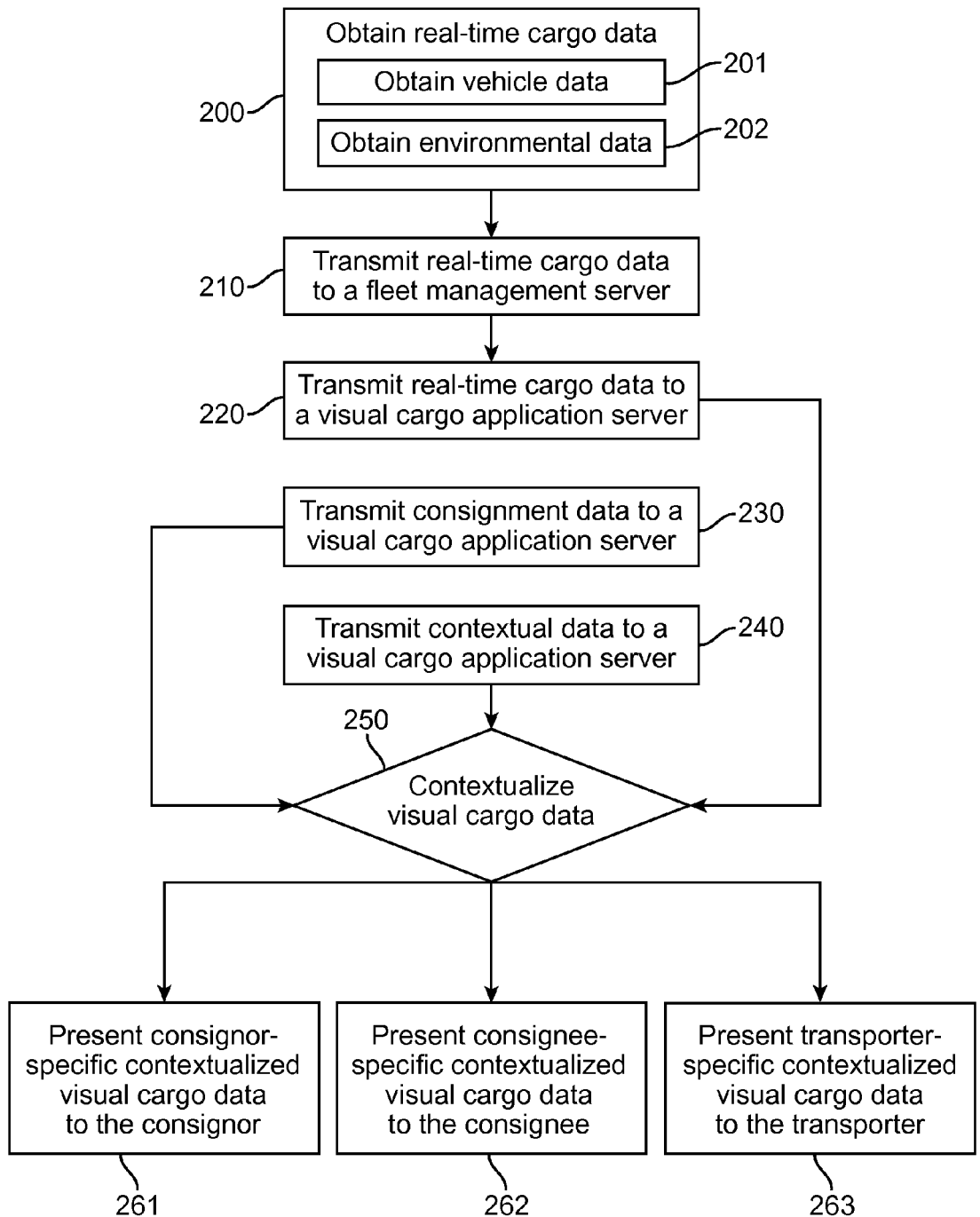
FIG. 4 illustrates a flow diagram showing one embodiment of a method of managing a cargo transaction.

Referring now to FIG. 4, which shows a flow diagram illustrating the steps of one exemplary operation of an embodiment of the present systems, devices, and methods. At step 200, real-time cargo status data are obtained. As previously described, real-time data includes cargo data that are obtained on a real-time, near real-time or periodic basis. The real-time cargo status data may comprise real-time vehicle data such as location of the cargo, the speed of the cargo, distance of the cargo from the consignor and/or consignee, and the like. At step 201, at least some of the real-time cargo status data may be obtained from one or more GPS satellites which communicate with one or more GPS-enabled monitoring device disposed on the vehicle, such as GPS vehicle mounted device, fitted on each vehicle to transmit the real-time vehicle data. Alternatively, the GPS-enabled monitoring device may be a personal GPS unit or a laptop computer, tablet computer, personal digital assistant (PDA), smart phone, mobile phone and the like that is embedded with a GPS unit.

The real-time cargo status data may comprise real-time environmental data. The real-time environmental data includes various data that could impact the cargo transaction such as traffic along the projected route of the cargo, the current weather condition, road condition, man-made incidents such as vehicular accidents, and/or natural incidents such as adverse weather. At step 202, the real-time environmental data may be obtained from one or more databases via one or more networks, such as the Internet. Additionally or alternatively, the real-time environmental data may be obtained from one or more satellites and/or sensors disposed on the vehicle or within the environment.

At step 210, the real-time cargo status data comprising real-time environmental data and/or the real-time vehicle data is transmitted to a fleet management server that is configured to calculate, integrate, manage, present, and transmit the real-time cargo status data.

At step 220, the real-time status data is transmitted from the fleet management server to the visual cargo application server. At step 230, consignment data is transmitted to the visual cargo application server. In one embodiment, consignment data includes cargo data such as the type (fragile, perishable, toxic, etc.), weight, dimension, shape, and the like of the cargo. Additionally, consignment data may include cargo identification data such as cargo identification number, Radiofrequency Identification (RFID) data, Barcode data, Quick Response (QR) Code data, High Capacity Color Barcode (HCCB), and the like. Furthermore, consignment data may include origin, destination, type of the carrier vehicle, vehicle information, driver information, planned route, scheduled pick up time, scheduled delivery time, estimated delivery time, estimated distance, and the like. The consignment data may be obtained from one or more consignment databases via one or more networks, such as the Internet.

At step 240, contextual data is transmitted to the visual cargo application data. In one embodiment, the contextual data is obtained from one or more contextual servers that are configured to access one or more end-user related databases such as one or more enterprise resource planning databases. In one embodiment, the contextual server 160 is configured to access a consignor database where consignor database comprises stock information, billing information, supply information, and the like. In another embodiment, the contextual server is configured to access a consignee database, where in one embodiment the consignee data comprises stock information, billing information, order information, planned cargo usage, and the like. In yet another embodiment, the contextual server is configured to access a transporter database, where in one embodiment, the transport database comprises vehicle information such a vehicle's schedule, location of the next cargo, number of vehicles deployed, vehicle performance information, the age and the model of the vehicle, driver-related information, driver performance information, route performance information, and the like.

At step 250, the visual cargo application server is configured to integrate the consignment data and the real-time vehicle data and/or real-time environmental data to compile a visual cargo data. The visual cargo data may comprise the expected time of delivery information that is adjusted based on the real-time vehicle data (i.e., the vehicle's current position, the current and/or average speed of the vehicle, and the like) and/or the real-time environmental data (i.e., current traffic along the route, weather information including adverse weather, and the like). The expected time of delivery may be updated on a real-time, near real-time or periodic basis. In addition, the visual cargo data may comprise additional information such as vehicle's current or projected route deviation.

Thereafter, the visual cargo application server is configured to contextualize the visual cargo data based on the contextual data.

In one embodiment, the visual cargo data may be contextualized according to the roles of the end-user. For example, the visual cargo data may be contextualized with transporter related contextual data. In such embodiment, the visual cargo data is contextualized based on the transporter related contextual data including vehicle information such a vehicle's schedule, location of the next cargo, number of vehicles deployed, vehicle performance information, driver performance information, and the like. By placing the visual cargo data within the context of the transporter data, one or more aspects of the transporter data and/or visual cargo data may be adjusted to produce a contextualized visual cargo data. For example, the contextualized visual cargo data may comprise a vehicle's schedule that is updated based on the real-time vehicle data and the expected time of delivery information found in the visual cargo data. Furthermore, the contextualized visual cargo data may comprise driver performance information that is updated based on vehicle's current or projected route deviation, the average speed of the vehicle. Additionally, the contextualized visual cargo data may comprise updated vehicle assignment information adjusted based on real-time vehicle data and the expected time of delivery information, projected route, location of the next cargo and the like.

In another embodiment, the visual cargo data may be contextualized with consignee related contextual data. In such embodiment, the visual cargo data is contextualized based on the consignee related contextual data comprises stock information, billing information, order information and the like. By placing the visual cargo data within the context of the consignee data, one or more aspects of the consignee data and/or visual cargo data may be adjusted to produce a contextualized visual cargo data. For example, the contextualized visual cargo data may comprise stock information and/or billing information that is updated based on the real-time vehicle data and the expected time of delivery information found in the visual cargo data. Furthermore, in an embodiment where the consignee is not the final destination, the schedule for pick-up or next delivery may be updated based on the visual cargo data. Similarly, the visual cargo data may be contextualized with consignor related contextual data. It is further contemplated that various visual cargo data may be contextualized with various transporter, consignee, and/or consignor contextual data to produce the contextualized visual cargo data.

It is contemplated that contextualized visual cargo data may be subject to various rules, logic and the like. For example, in one embodiment, the contextualized visual cargo data that comprises driver performance information that is updated based on the average speed of the vehicle, the driver performance information may be updated only if the average speed of the vehicle exceeds or falls below a threshold. In one embodiment, the various rules, logic, and the like may be pre-configured or they may be configured by the user.

At steps 261, 262, and 263, the contextualized visual cargo data are presented to the end-users. Access to the contextualized visual cargo data are subject to user privilege, various security and encryption protocols.

If the user has transporter access privilege, at step 261, the consignor-specific contextualized visual cargo data and/or the un-contextualized visual cargo data are presented to the consignor. If the user has consignee access privilege, at step 262, consignee-specific contextualized visual cargo data and/ or the un-contextualized visual cargo data are presented to the consignee. Similarly, if the user has consignor access privilege, at step 263, transporter-specific contextualized visual cargo data and/or the un-contextualized visual cargo data are presented to the transporter.

Figure 5:
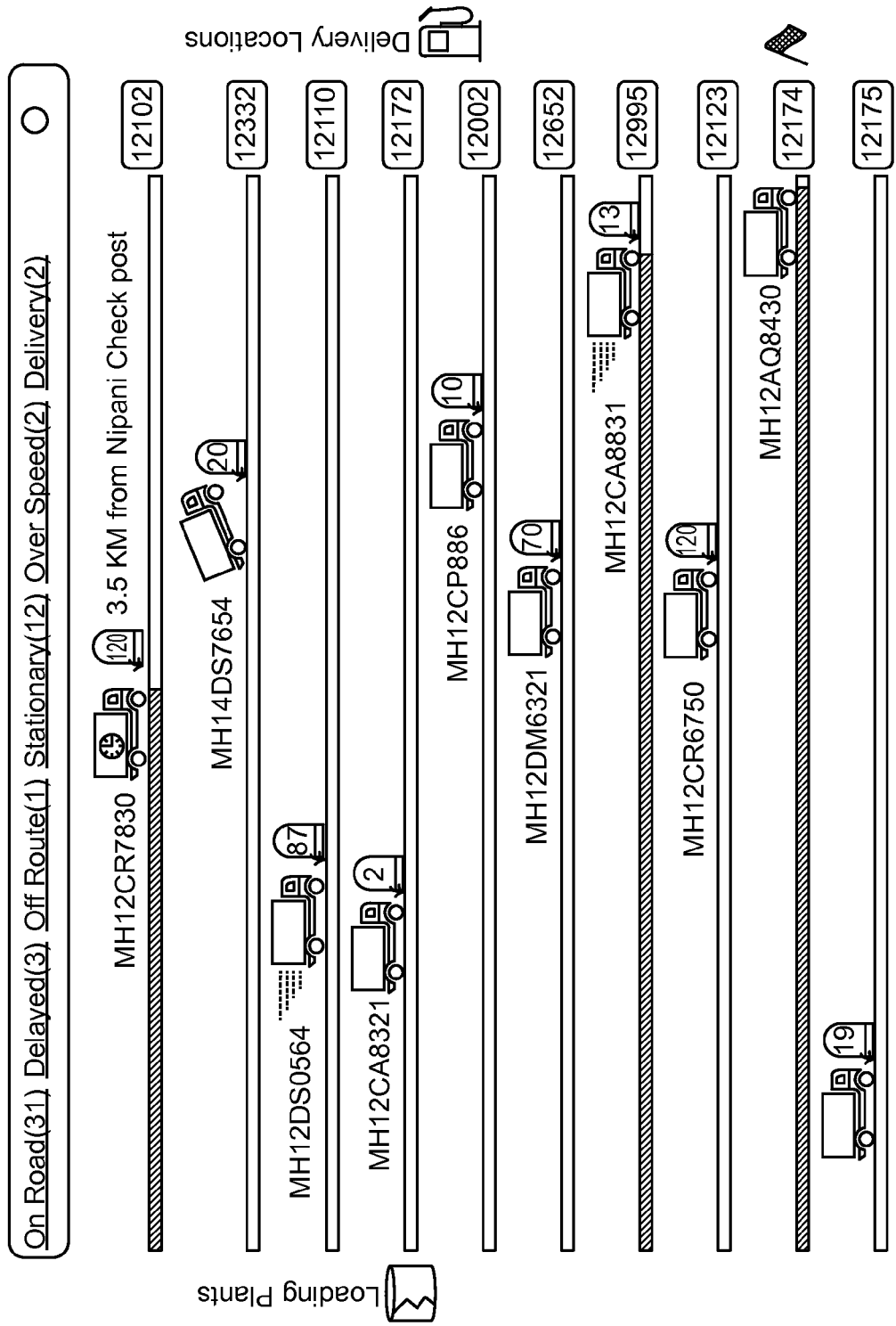
FIG. 5 illustrates one embodiment of a user-interface showing graphical representations of a cargo transaction.

In one embodiment, the visual cargo data (the un-contextualized visual cargo data) and the contextualized visual cargo data may be presented to the user via a user-interface. In one embodiment, the user-interface may be configured as shown in FIGS. 3A-3B as described above. In another embodiment, the user-interface may be visual mimic of the real time movement of a cargo being transported by vehicle. As seen in FIG. 5, the user-interface is configured to indicate one or more exceptional events and/or various characteristics in the cargo transport with one or more icons, labels and the like. For example, the icons may graphically indicate the type of the vehicle, which is exemplarily shown as a truck in FIG. 5. Other contemplated icons include various icons to graphically indicate relative position on the route, meteorological status along the transport route, type of the cargo transported by the vehicle and the like. Furthermore, the status of the cargo transport such as distance of route covered, balance distance from the destination, estimated delivery time and the like may be graphically indicated. Also the icons may graphically indicate the status of cargo movement such as on time or delayed, and exceptional events such as over speeding, sudden acceleration, sudden deceleration and delivery to destination.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A computer implemented method for managing a cargo transaction of at least one cargo, comprising:
   transmitting consignment data to a visual cargo server;
   tracking cargo status data of a vehicle transporting the cargo, wherein at least some of the cargo status data comprises data collected from a GPS-enabled monitoring device;
   transmitting the cargo status data via a wireless network to the visual cargo server, wherein the visual cargo server integrates the consignment data and the cargo status data to produce virtual cargo data;
   obtaining contextual data from one or more contextual servers;
   transmitting the contextual data to the visual cargo server;
   providing context to the visual cargo data by integrating the virtual cargo data with the contextual data to produce a contextualized visual cargo data; and
   presenting one or more aspects of the contextualized visual cargo data to a user, wherein the one or more aspects of the contextualized visual cargo data is selected based on a role of the user and wherein the role of the user includes consignor, consignee, and transporter.

2. The computer implemented method of claim 1, wherein the consignment data comprises originating codes, geocodes, destination codes, geo-codes of the cargo, departure time of the cargo or expected time of arrival of the cargo.

3. The computer implemented method of claim 1, wherein the consignment data comprises cargo data and cargo identification data.

4. The computer implemented method of claim 1, further comprising transmitting real-time environmental data to the visual cargo server.

5. The computer implemented method of claim 4, wherein the real-time environmental data comprises one or more of traffic information, weather information, road condition, or incident information.

6. The computer implemented method of claim 1, wherein the monitoring device is a vehicle mounted device.

7. The computer implemented method of claim 6, further comprising obtaining real-time environmental data collected from one or more sensors disposed on the vehicle.

8. The computer implemented method of claim 1, wherein the cargo status data is transmitted to the visual cargo server via a fleet management server.

9. The computer implemented method of claim 1, wherein the wireless network is a cellular network such as a PSTN, GSM, GPRS, EDGE, CDMA, WCDMA, HSP A, LTE, or WiMAX network.

10. The computer implemented method of claim 1, wherein the contextual data are specific to a consignor, consignee or transporter.

11. The computer implemented method of claim 1, further comprising alerting the user based on the visual cargo data.

12. A computer implemented method of managing a cargo transaction, comprising:
   transmitting consignment data to a visual cargo server;
   tracking cargo status data of a vehicle responsible for delivering the cargo, wherein at least some of the cargo status data comprises data collected from a GPS-enabled monitoring device;
   transmitting the cargo status data via a wireless network to the visual cargo server, wherein the visual cargo server integrates the consignment data and the cargo status data to produce virtual cargo data;
   transmitting the visual cargo data to a contextual server comprising contextual data, wherein the contextual server is configured to provide a context to the virtual cargo data to produce a contextualized visual cargo data by integrating the virtual cargo data with the contextual data; and
   presenting one or more aspects of the contextualized visual cargo data to a user, wherein the one or more aspects of the contextualized visual cargo data is selected based on a role of the user and wherein the role of the user includes consignor, consignee, and transporter.

13. The computer implemented method of claim 12, wherein the consignment data comprises originating geocodes, destination geo-codes of the cargo, departure time of the cargo or expected time of arrival of the cargo.

14. The computer implemented method of claim 12, wherein the contextual data are specific to a consignor, consignee or transporter.

15. A system for monitoring a cargo transaction, comprising:
   a visual cargo server for receiving real time location and cargo status information over a wireless communication network;
   a monitoring device associated with the cargo, the device comprises:
      a processor for controlling operation of the device;
      a GPS circuit for receiving GPS data;
      a wireless communication modem and antenna in communication with the processor for transmitting GPS location data to the visual cargo server; and
      a contextual server configured to transmit the contextual data to the visual cargo server;
   wherein the visual cargo server is configured to obtain consignment data and integrate said consignment data with the GPS data to produce a visual cargo data and to contextualize said visual cargo data with contextual data, wherein the visual cargo server is configured to transmit at least one aspect of the contextualized visual cargo data selected based on a role of a user to one or more end-use devices.

16. The system of claim 15, wherein the wireless communication modem and antenna is configured to interface with a cellular network such as a PSTN, GSM, GPRS, EDGE, CDMA, WCDMA, HSPA, LTE, or WiMAX network.

17. The system of claim 15, wherein the consignment data comprises originating geo-codes, destination geo-codes of the cargo, departure time of the cargo or expected time of arrival of the cargo.

\* \* \* \* \*